United States Patent [19]
Huang

[11] Patent Number: 5,734,771
[45] Date of Patent: Mar. 31, 1998

[54] PACKAGING ASSEMBLY FOR A LASER ARRAY MODULE

[75] Inventor: Sun-Yuan Huang, Blandon, Pa.

[73] Assignee: Lucent Technologies Inc., Murray Hills, N.J.

[21] Appl. No.: 736,701

[22] Filed: Oct. 28, 1996

[51] Int. Cl.⁶ .................................................. G02B 6/42
[52] U.S. Cl. .......................... 385/93; 359/619; 372/50
[58] Field of Search ......................... 385/33, 35, 88, 385/89, 93; 359/19, 20, 455, 565, 619; 372/50

[56] References Cited

U.S. PATENT DOCUMENTS

| | | | |
|---|---|---|---|
| 4,740,259 | 4/1988 | Heinen | 385/89 X |
| 4,826,269 | 5/1989 | Streifer et al. | 359/19 |
| 4,994,664 | 2/1991 | Veldkamp | 359/565 X |
| 5,369,659 | 11/1994 | Furumoto et al. | 372/50 |
| 5,463,610 | 10/1995 | Nishikawa | 369/121 |
| 5,481,629 | 1/1996 | Tabuchi | 385/89 X |
| 5,500,869 | 3/1996 | Yoshida et al. | 372/50 |

*Primary Examiner*—John D. Lee

[57] ABSTRACT

An optical subassembly comprises a two-dimensional semiconductor laser array having a plurality of laser diodes arranged in rows and columns. The laser diodes are configured to provide laser lights at a first and a second direction. A first lenslet module is disposed adjacent the semiconductor laser array, such that light emitted from the laser array in the first direction is collected by the lenslet module. The lenslet module is further configured to focus the collected light at a given first focal point that may be disposed on a receiving end of a fiber optic. A second lenslet module is disposed adjacent the semiconductor laser array, such that light emitted from the laser array in the second direction is collected by the second lenslet module. The second lenslet module is further configured to focus said collected light at a given second focal point disposed at the receiving end of a photodetector.

16 Claims, 3 Drawing Sheets

PACKAGING ASSEMBLY FOR A LASER ARRAY MODULE

FIELD OF THE INVENTION

This invention relates to optical devices and more specifically to a packaging assembly employed to contain a laser and lens array system.

BACKGROUND OF THE INVENTION

Many optical devices include a laser module configured to provide a laser light for optical communications purposes. Typically, such laser modules include a transmitter comprising a laser source that emits a polarized light, and a thermoelectric cooler (TEC) for maintaining the temperature of the laser source at a desired level. In many applications it is desirable to contain all the elements of a laser module in a compact housing. However, this requirement may be difficult to achieve when a high power laser source is necessary to use.

Because a single semiconductor laser may not generate sufficient power, currently available high power semiconductor laser sources, which generate one watt or larger optical power, are made of semiconductor laser arrays. Such high power laser arrays have been employed in applications such as optical storage, printing and communications. These arrays are made of single stripes of semiconductor lasers, and are sometimes stacked to form two dimensional laser arrays. However conventional two-dimensional semiconductor lasers have many shortcomings, specifically low thermal performance and relatively large size.

For example, these conventional semiconductor laser arrays require complex heat sinking arrangements to overcome relatively poor thermal performance and to maintain the system operating temperature at an acceptable level. FIG. 5 illustrates a semiconductor laser array 10 employing a plurality of laser diodes 12. In order to maintain a desirable operating temperature range, a complex heat sinking arrangement is employed, including bar bond plates 14, which are disposed adjacent to each laser diode 12. Furthermore, each laser diode is electrically coupled to an insulated wirebond plate 17 via a wirebond arrangement 16. Finally, bar bond plates 14 are coupled to an insulator plate 18, which in turn is disposed on a heatsink plate 20.

For substantially high energy laser diodes, even the heat sinking arrangement of FIG. 5 may not be sufficient. To this end, it may become necessary to employ a liquid cooling package 26 as illustrated in FIG. 6. Two liquid coolant tubes 28 and 30 carry coolant liquid to and from the semiconductor laser assembly 10. This results in higher manufacturing cost and lower reliability.

Another disadvantage associated with prior art semiconductor laser arrays, is the lens arrangement necessary for directing lights emitted by individual laser elements to a focal point, such as the receiving end of a fiber optic. To this end, it is necessary to employ a lens to accomplish the desired focusing of laser lights. FIGS. 3 and 4 illustrate prior art single lens systems that may be employed to focus the light received from a semiconductor laser array 362 containing a plurality of laser diodes 364. As explained in more detail in a patent application Ser. No. 08/736,697, attorney docket no. (Huang-6) filed concurrently with the present invention and incorporated herein by reference, the arrangements illustrated in FIGS. 3 and 4 are not suitable for collecting laser lights generated by a two-dimensional semiconductor laser array. Furthermore, these arrangements require a substantially long distance between the semiconductor laser array and the light collecting lens, thus requiring a larger space.

Because of these shortcomings it is difficult to employ semiconductor laser arrays in a compact housing. Thus, there is a need for a laser module that is able to contain a relatively high power semiconductor laser array and a lens system inside a compact housing.

SUMMARY OF THE INVENTION

Briefly, in accordance with one aspect of the invention a laser module comprises: a housing having a top surface, a bottom surface and a first and second walls having an opening for passing light through an optical fiber; a semiconductor laser array is disposed in the housing, and is configured to generate a laser light emanating from a plurality of laser sources disposed in the array. The laser light also emanates from opposite sides of the laser array. A first lenslet module is configured to receive light from the first side of the semiconductor laser array and emit a converted light through the first wall of the housing to a focal point located, for example at an opening end of an optical fiber. A second lenslet module is configured to receive light from the second end of the semiconductor laser array and emit a converted light to a second focal point, for example at a receiving end of a photodetector.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE DRAWINGS

Figure 1A:
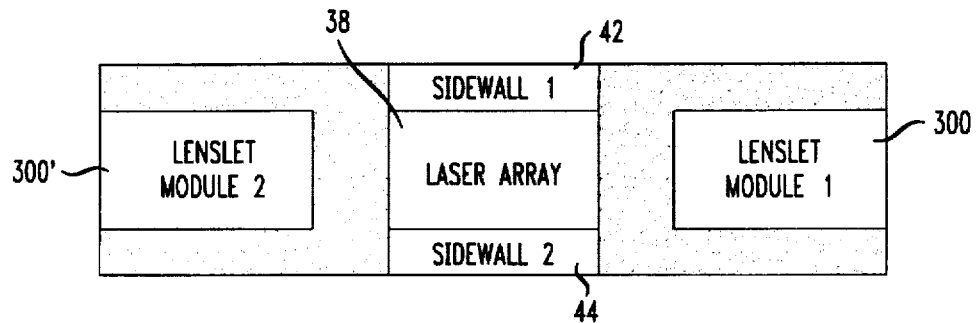
FIGS. 1(a) and 1(b) respectively are top view and side view of a packaging arrangement in accordance with one embodiment of the present invention.
Figure 1B:
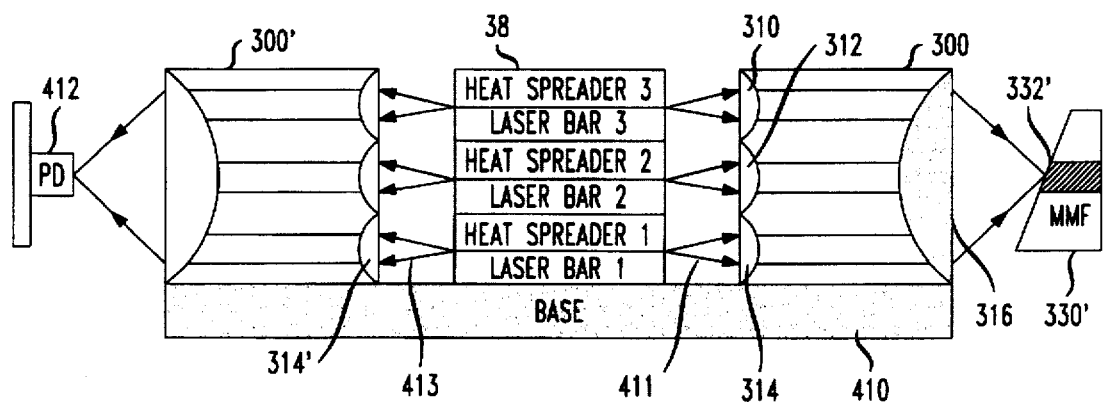
Figure 2A:
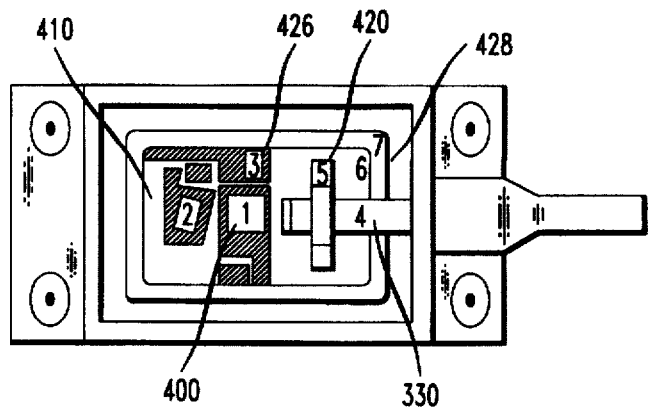
FIGS. 2(a) and 2(b) respectively are top view and side view of a laser array module employing a packaging arrangement in accordance with one embodiment of the present invention.
Figure 2B:
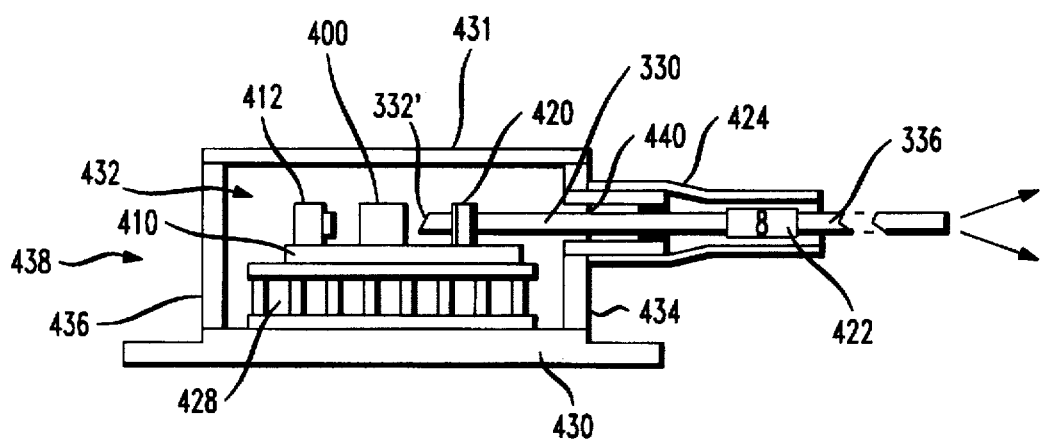
Figure 3:
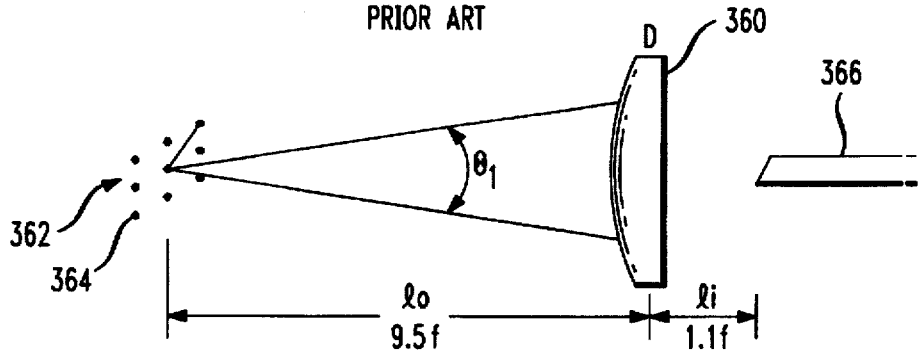
FIG. 3 is a prior art lens arrangement employed to collect light from a semiconductor laser array.
Figure 4:
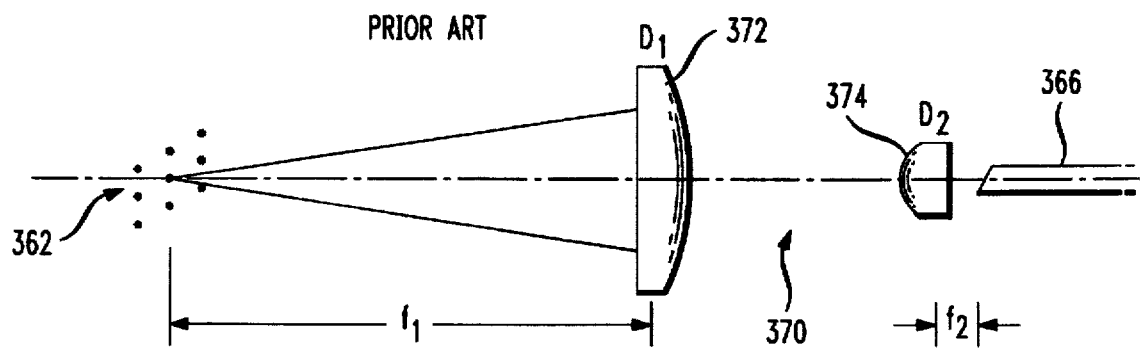
FIG. 4 is another prior art lens arrangement employed to collect light from a semiconductor laser array.
Figure 5:
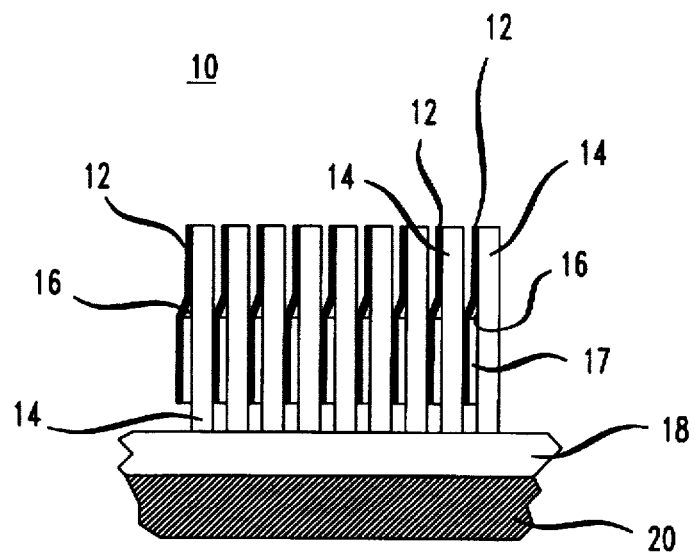
FIG. 5 illustrates a prior art heat sinking arrangement for a semiconductor laser array.
Figure 6:
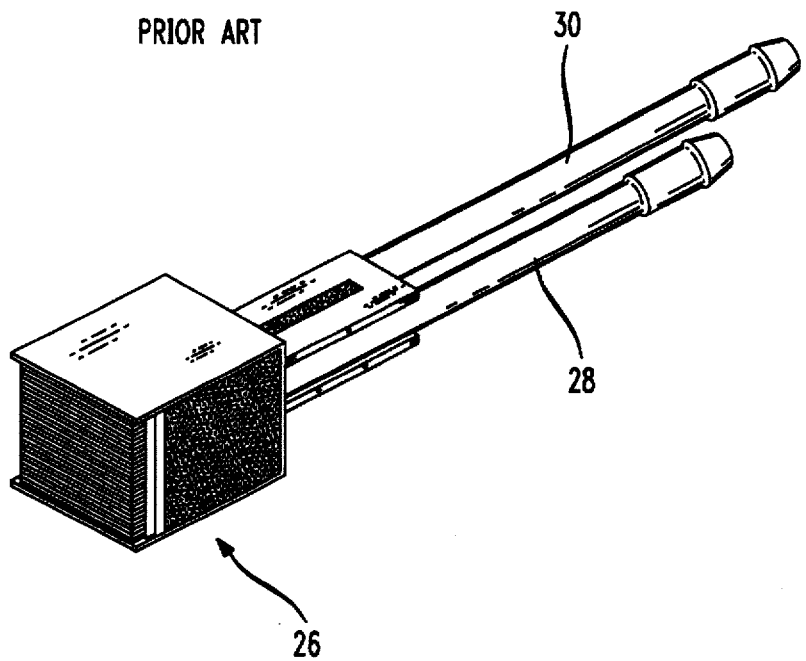
FIG. 6 illustrates another prior art heat sinking arrangement for a semiconductor laser array.

FIGS. 2(a) and 2(b) illustrate a semiconductor laser array module 432, in accordance with one embodiment of the present invention, although the invention is not limited in scope in that respect. Laser array module 432 comprises a module housing 438 that has front and back walls 436 and 434, a top lid 431, and a base wall 430. The module housing also includes side walls to form a hermetic package. An optical subassembly 400 is disposed in module housing 438, as explained in more detail, in reference with FIGS. 1(a) and 1(b). Optical subassembly 400 is disposed on a common base 410, and includes a semiconductor laser array for generating a laser light and two monolithic lenslet modules for receiving the laser light and converting the light to a focal point as will be explained below. A thermoelectric cooler 428 is disposed on base wall 430, upon which common base 410 is disposed. The purpose of thermoelectric cooler 428 is to maintain the temperature of components disposed upon it within a reasonable temperature range.

Housing 438 further contains a photo detector 412, disposed on common base 410, and is configured to receive light from optical subassembly 400, to detect variations in the intensity of the light generated by optical subassembly 400. The receiving surface of photodetector 412 is located substantially within the focal point of a lenslet module (FIG. 1) configured to monitor light from optical subassembly 400 toward photo detector 412. A fiber optic 330 is positioned proximate to optical subassembly 400 so as to receive light from subassembly 400. A dip 420 (FIGS. 2(a) and 2(b)) is attached to common base 410 to securely fix the position of fiber optic 330 relative to optical subassembly 400. Fiber optic 330 extends through an opening 440 defined within the front wall 434 of housing 438. Fiber optic 330 extends through an oversleeve 422 and is disposed within a strain release cover 424. Oversleeve 422 is used to join two portions of protective sleeves of fiber optic 330. Furthermore, strain release 424 is used to protect the fiber from sharp bending. A thermistor 426 is placed near optical subassembly 400 to monitor the temperature of the laser array, and provide a feedback signal for thermoelectric cooler 428.

Thus, in accordance with the principles of the present invention, a semiconductor laser array and a corresponding lens arrangement are disposed in a compact housing. The arrangement of optical subassembly 400 is explained in more detail hereinafter.

As illustrated in FIGS. 1(a) and 1(b), optical subassembly 400 comprises a semiconductor laser array 38 disposed on a base plate 410. The arrangement of laser array 38 in accordance with one embodiment of the present invention is described in more detail in a patent application, Ser. No. 08/736,698, Attorney Docket No. (Huang-5) filed concurrently with the present invention, and incorporated herein by reference. Laser array 38 includes a plurality of laser bars disposed in between heat spreader plates and two side walls 42 and 44. Laser array 38 is configured to emit light from both of its sidewalls as illustrated by optical rays 411 and 413. The arrangement of laser array 38 provides substantially acceptable thermal performance, far exceeding the thermal performance of prior art laser array systems. Because of this enhanced thermal performance, laser array 38 can be packaged in a compact housing, such as the one disclosed in reference with FIGS. 2(a) and 2(b), or other type of compact housings, such as a standard 14 in butterfly box.

A monolithic lenslet module 300 is disposed adjacent to one side of semiconductor laser array 38 and over base plate 410. The arrangement of lenslet module 300 in accordance with one embodiment of the present invention is described in further detail in the above-mentioned patent application, Ser. No. 08/736,697 Attorney Docket No. (Huang-6) filed concurrently with the present invention and incorporated herein by reference. Lenslet module 300 includes individual lenslets, such as 310, 312 and 314 that are configured to receive laser lights from semiconductor laser array 38, and provide the received light to an emitting lens 316. Emitting lens 316 in turn directs all light collected from individual laser diodes to the core of a fiber optic 332'.

Likewise, a monolithic lenslet module 300' is disposed adjacent to the other side of semiconductor laser array 38 and over base plate 410. The arrangement of lenslet module 300' is the same as lenslet module 300. The light collected by lenslet module 300' is directed to a photo detector 412, which is employed as a feedback sensor for measuring the intensity of light emitted by semiconductor laser array 38. During operation, when a laser diode in semiconductor laser array 38 fails, the intensity of light emitted by the laser array decreases. Photo detector 412 senses the decrease of light intensity and causes a feedback circuit (not shown) to provide a proportionate increase of current to array 38 to maintain the optical power of the array at a constant level. Thus, in accordance with the principles of the present invention, a laser module having a relatively high power laser source is contained in a compact package.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

I claim:

1. An optical subassembly comprising:
   a two-dimensional semiconductor laser array having a plurality of laser diodes arranged in rows and columns, said laser diodes configured to provide laser lights at a first and a second direction;
   a first lenslet module disposed adjacent said semiconductor laser array, such that light emitted from said laser array in said first direction is collected by said lenslet module, said lenslet module further configured to focus said collected light at a given first focal point; and
   a second lenslet module disposed adjacent said semiconductor laser array, such that light emitted from said laser array in said second direction is collected by said second lenslet module, said second lenslet module further configured to focus said collected light at a given second focal point.

2. An optical subassembly in accordance with claim 1, wherein said laser array, and said first and second lenslet modules are disposed on a base plate.

3. An optical subassembly in accordance with claim 1, wherein a receiving end of a fiber optic is disposed at said first focal point.

4. An optical subassembly in accordance with claim 3, wherein a receiving surface of a photodetector is disposed at said second focal point.

5. An optical subassembly in accordance with claim 1, wherein said semiconductor laser array further comprises:
   a heat conducting base plate;
   at least one laser bar disposed over said heat conducting base plate, said laser bar having a plurality of laser diodes stacked adjacent each other;
   a heat spreader plate disposed over said laser bar; and
   at least two sidewalls disposed at opposite ends of said heat conducting base plate, said heat spreader plate being thermally connected to said two sidewalls.

6. An optical subassembly in accordance with claim 5, wherein said semiconductor laser array further comprises a plurality of said laser bars and said heat spreader plates stacked upon each other, such that each heat spreader plate is disposed in between two of said laser bars.

7. An optical subassembly in accordance with claim 6, wherein said laser bars are substantially electrically isolated from said sidewalls.

8. An optical subassembly in accordance with claim 7, wherein said base plate of said laser array, said side walls of said laser array and said heat spreader plates of said laser array are made of a ceramic material having a substantially high thermal conductivity.

9. An optical subassembly in accordance with claim 8, wherein said individual laser diodes are edge emitting single transverse mode lasers.

10. An optical subassembly in accordance with claim 1, wherein said each one of said first and second lenslet module further comprises:
   a transparent substrate made of a material capable of transmitting light, said transparent substrate having a light-receiving surface and a light-emitting surface;
   a plurality of light-receiving lenslets disposed on said light-receiving surface of said substrate, such that each lenslet corresponds to a laser source in the laser array; and
   an emitting lens disposed on said light-emitting side of said substrate, in order to focus light collected by said receiving lenslets at said given focal points.

11. An optical subassembly in accordance with claim 10, wherein said light receiving lenslets are configured as plano-convex lenses.

12. An optical subassembly in accordance with claim 11, wherein said light-emitting lens is configured as a plano-convex lens.

13. An optical subassembly in accordance with claim 12, wherein said light receiving lenslets are located on said light receiving side of said substrate such that each light receiving lenslet substantially receives the light emitted from a corresponding laser in said semiconductor laser array.

14. A laser module assembly comprising:
   a housing having a plurality of walls for enclosing said laser module;
   a thermoelectric cooler disposed on a base wall of said housing;
   a base plate disposed on said thermoelectric cooler;
   a two-dimensional semiconductor laser array disposed on said base plate, said laser array further comprising a plurality of laser diodes arranged in rows and columns, said laser diodes configured to provide laser lights at a first and a second direction;
   a first lenslet module disposed adjacent said semiconductor laser array on said base plate, such that light emitted from said laser array in said first direction is collected by said lenslet module, said lenslet module further configured to focus said collected light at a given first focal point at a receiving end of a fiber optic disposed partially on said base plate; and
   a second lenslet module disposed adjacent said semiconductor laser array, such that light emitted from said laser array in said second direction is collected by said second lenslet module, said second lenslet module further configured to focus said collected light at a given second focal point at a receiving end of a photodetector disposed on said base plate.

15. A laser module assembly in accordance with claim 14, wherein the front wall of said housing includes an opening through which said fiber optic passes through.

16. The laser module assembly in accordance with claim 15, wherein said housing is a 14 pin butterfly assembly.

* * * * *